June 30, 1970 A. G. CHYNOWETH ET AL 3,518,659

HIGH SPEED LIGHT SWITCH

Filed July 19, 1965

INVENTORS A.G. CHYNOWETH
W.L. FELDMANN
BY
ATTORNEY

United States Patent Office
3,518,659
Patented June 30, 1970

3,518,659
HIGH SPEED LIGHT SWITCH

Alan G. Chynoweth, Summit, and William L. Feldmann, Bernardsville, N.J., assignors to Bell Telephone Laboratories, Incorporated, New York, N.Y., a corporation of New York Filed July 19, 1965, Ser. No. 472,870
Int. Cl. H03k *13/02*
U.S. Cl. 340—347 1 Claim

ABSTRACT OF THE DISCLOSURE

Disclosed herein is a tunnel diode arranged for optical switching at microwave rates.

This invention relates to semiconductor junction devices, and, more particularly, to such devices for use in optical switching and pulsing applications.

Since the invention of the optical maser or laser, the state of the optical art has undergone and continues to undergo a large expansion because of the virtually limitless implications of the laser. This great activity has been directed into many channels, one of which, the one pertinent to this invention, is the use of solid state junction devices as components in optical systems.

In both communications and logic type applications of light, there has long been a need for a high speed, wide band optical switch, which, in response to applied electrical signals produces an optical output which varies in accordance with the character of the electrical signal. More particularly, there is a need for a simple, solid state device which is capable of producing a switched, i.e. pulsed, output at microwave frequencies. Such a device can perform any of a large number of functions in both communications and logic systems, such as, for example, an analog to digital converter, a pulse encoder, an and/or switch, a voltage level indicator or control, and many others too numerous to mention.

The present invention, which, in essence, is simply a high speed optical switch, is a semiconductor junction diode of material, such as gallium arsenide (GaAs), suitably doped to function as a tunnel diode having a negative resistance over a portion of its voltage-current characteristic. With such a diode, the I–V characteristics is made up of three different types of current, i.e. the band-to-band tunneling current, the excess current, and the diode current. Such a diode can be made to emit light over a portion of the excess current region by application of a suitable voltage. I have found that the diode may be switched between a light and no-light condition extremely rapidly, in fact at microwave frequencies, if it is biased so that operation is in the band-to-band and excess current regions.

In one illustrative embodiment of the invention, a gallium-arsenide or other suitable material junction diode, doped to a concentration of approximately $10^{18}$–$10^{19}$ donors and acceptors per cubic centimeter, is connected in series with a source of bias voltage and a source of signals to be translated. The light output of the diode is applied to a suitable detecting or utilization device. In operation, the bias source is utilized to apply sufficient voltage to the diode to insure that its operation is between the band-to-band and excess current regions when the signal is applied to the diode. The applied signal, as will be explained hereinafter, causes the diode to switch back and forth between the band-to-band and excess current portions of the diode characteristic, producing a pulsed light output at the signal frequency.

In another illustrative embodiment of the invention, a plurality of diodes are connected in series, with each diode biased differently, so that when a signal is applied to the series, its magnitude determines which diodes break down and emit light. The light outputs of the diodes are focused onto individual detectors, with the net result that an analog to digital conversion takes place.

In all embodiments of the invention, the principal feature is the operation of the diode at a bias such that it switches back and forth between the band-to-band and excess current regions of its I–V characteristic.

The various features and principles of the invention will be more readily understood from the following detailed description, read in conjunction with the accompanying drawings, in which.

Figure 1:
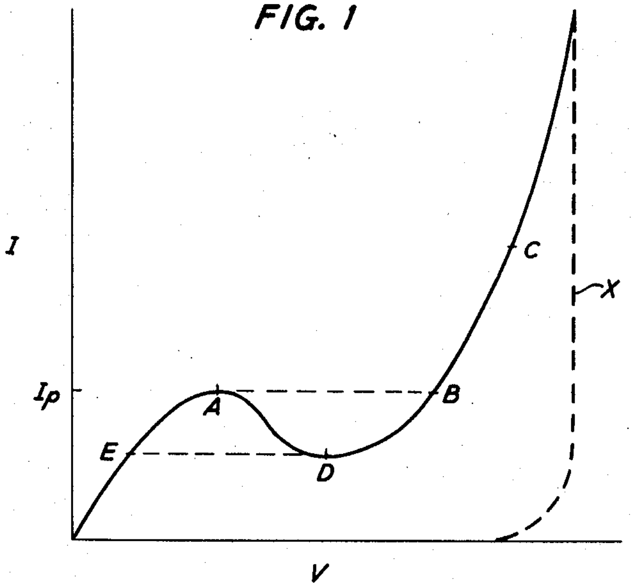
FIG. 1 is a graph of the current-voltage characteristic of a typical diode of the present invention.

Turning now to FIG. 1, there is shown a current-voltage characteristic of a tunnel diode as discussed heretofore. It can be seen that as the voltage applied across the diode increases, the diode current increases from zero to a point A, the threshold point, where the current is $I_p$. At this point, a further increase in voltage results in a decreasing current down to the point D. Thus far, the current through the diode has been principally the band-to-band tunnel current, but at point D, the excess current becomes dominant. Further increases in voltage produce a steadily rising excess current, through points B, C and beyond, until the excess current is finally masked by the diode current depicted by the dotted line $x$. It is known that such a diode emits light in the excess current region beyond the point B. Applicants, on the other hand, have found that the diode emits light in the region between B and D and, further, that the diode switches from point A, a "no light" condition, to the point B, a "light" condition extremely rapidly, in times of the order of $10^{-10}$ seconds or less. In like manner, it switches from point D, a "light" condition, to the point E, a "no light" condition, equally as fast. As a consequence, it can be seen that such a diode functions as an extremely rapid light switch.

Figure 2:
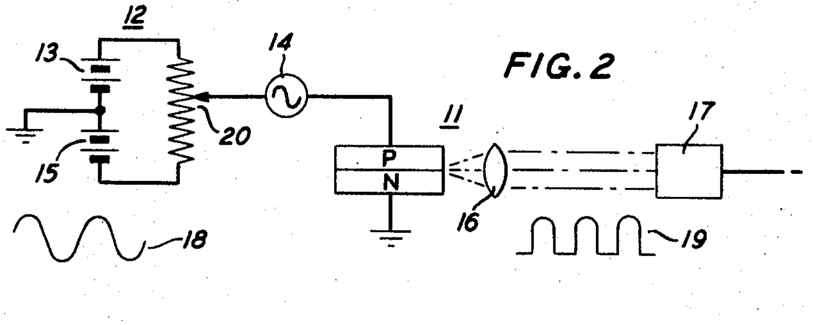
FIG. 2 is a schematic diagram of a first illustrative embodiment of the invention.

In FIG. 2 there is shown a first illustrative embodiment of the invention wherein a p-n junction diode 11 of heavily doped material such as gallium arsenide or gallium antimonide, for example, is connected in series with bias sources 12 and a source 14 of signals at microwave frequencies. Source 12 comprises a pair of batteries 13 and 15 and a rheostat 20 so arranged that variable back or forward bias voltages are available. Obviously, any other source of bias may be used that is capable of supplying the desired range of voltages. The output of source 14 is shown as a microwave voltage 18. When this voltage is applied across diode 11, at some point in the positive half cycle of the signal, the point A of FIG. 1 is reached and the diode current snaps over to point B, where it commences to emit light. As the applied voltage decreases, the light emitted by the diode continues until point D is reached, where it cuts off and remains cut off during the remaining portion of the signal cycle. As a consequence, the output of the diode is a train of light pulses 19. This output is focused by a lens 16 onto a detector 17, which may be, for example, a germanium or silicon avalanche photodiode. The output of detector 17 may be fed to any one of a number of types of circuits, such as, for example, a switching network.

It can be seen from the foregoing that adjustment of the bias voltage determines when the current through the diode reaches the point A of the diode characteristic. Furthermore, the bias level also determines how much of the positive half cycle of signal voltage is utilized to produce light. It is possible, therefore, to have extremely sharp or narrow light pulses where only a small fraction of the positive half cycle is used. Where a simple light switch is desired, the source 14, which may take any one of a number of forms, such as the output of a computer stage, for example, may produce a pulse output. In such case, the diode switches on in response to a pulse, and off when the pulse ceases. In all cases, the bias voltage is adjusted to produce an on-off operation, that is, operation between the band-to-band and excess current regions of the diode characteristic. This on-off operation, as pointed out before, is at high microwave frequencies, or at extremely high speeds, which produces virtually immeasurably fast pulse rise times in the diode light output.

Figure 3:
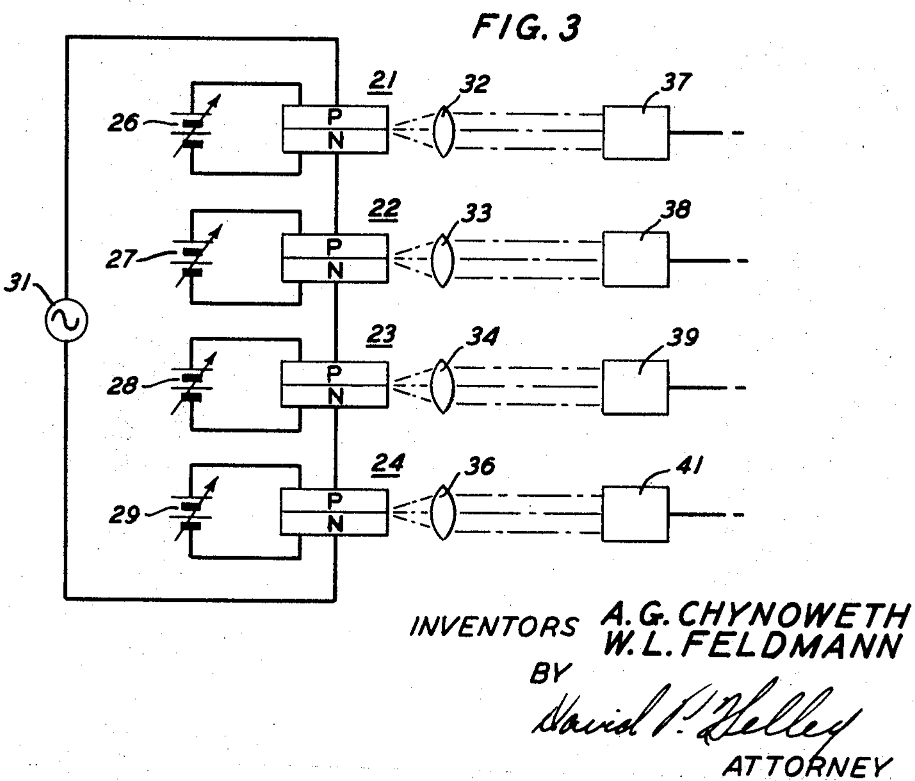
FIG. 3 is a schematic diagram of a second illustrative embodiment of the invention.

In FIG. 3 there is shown an arrangement in which the principles of the invention are applied to analog to digital conversions. In the arrangement of FIG. 3, a plurality of p-n junction diodes 21, 22, 23, 24 of suitable material, as discussed in the foregoing are connected in series with a source of signals 31, which may take any one of a number of well known forms. Each of the diodes 21, 22, 23, 24 is supplied with a bias voltage from adjustable bias sources 26, 27, 28, 29, respectively. It is to be understood that the method of biasing the individual diodes shown here is a schematic illustration only. Various ways of supplying each diode with a variable bias can be used. Since various diode parameters may vary from diode to diode, it is generally necessary that there be means for offsetting these differences, and individual bias supplies for each diode are one way of accomplishing this. On the other hand, it is possible that diodes of different threshold points might be selected, in which case biasing is not necessary.

The outputs of the diodes are focused by lenses 32, 33, 34 and 36 onto individual detectors 37, 38, 39 and 41, respectively.

In operation, assuming the diodes to be identical, each is biased to a different level so that each commences to emit light at a different value of signal voltage. For example, assuming the signal voltage to be a sine wave, diode 21 may be biased to emit light very early in the positive half cycle of the signal voltage, while diode 24 does not emit light until the peak of the positive half cycle. As a consequence, light pulses are applied to the detectors 37, 38, 39 and 41 which represent a quantization of the input wave. Where the signal is not a sine wave but, for example, a typical analog type of wave, the outputs of the detectors are a series of electrical pulses defining a digital representation of the analog wave.

It is readily apparent that the various diodes may be biased in accordance with a particular code so that, for example, diode 23 emits a light pulse before diode 21. Clearly any switching sequence and any number of diodes may be used, depending on the desired application.

The foregoing embodiments have been shown to illustrate the principles of the invention. Numerous applications of these principles may occur to workers in the art without departing from the spirit and scope of the invention.

What is claimed is:

1. A device for the conversion of an analog signal of microwave frequency to a digital signal, which comprises:

(a) input means to which the analog signal of microwave frequency is applied;

(b) a plurality of p-n junction tunnel diodes connected in series and connected to said input means, each diode being characterized by a current peak type of negative resistance current-voltage characteristic characterized by a band-to-band tunnel current threshold and an excess current region, and each of the diodes being further characterized by light emission in excess current region;

(c) means for supplying a voltage bias to each of the diodes so that as the amplitude of the said analog signal changes, different particular diodes of the said plurality of p-n junction tunnel diodes will be caused to switch their operation between the band-to-band current region and the excess current region, whereby the said particular diodes will emit light pulses characterized by a switching time of $10^{-10}$ seconds or less, and whereby the pattern of the light pulses emitted at any instant will be a coded digital representation of the amplitude of the analog signal at that instant; and (d) means for detecting the light pulses.

References Cited

UNITED STATES PATENTS

| | | | |
|---|---|---|---|
| 3,321,631 | 5/1967 | Biard et al. | 250—209 |
| 3,242,479 | 3/1966 | Euler | 340—347 |
| 3,384,837 | 5/1968 | Toussaint et al. | 307—311 X |

OTHER REFERENCES

W. P. Dumke et al., vol. 6, No. 9, February 1964 IBM Technical Disclosure Bulletin, p. 86.

J. L. Anderson, J. L. Reynolds, IBM Technical Disclosure Bulletin, vol. 7, No. 1 p. 65, June 1964.

Kern K. N. Chang, Parametric and Tunnel Diodes, received in Patent Office June 8, 1964, copyright 1964 pp. 44–45 and 54–55.

R. L. Anderson, Radiation From Gas Tunnel Diodes, proceedings of the IEEE, p. 610, April 1963.

J. I. Pankove et al., Alight Source Modulated at Microwave Frequencies, proceedings of the IRE pp. 1976–77, September 1962.

MAYNARD R. WILBUR, Primary Examiner

C. D. MILLER, Assistant Examiner

U.S. Cl. X.R.

307—311